Aug. 22, 1950 — H. H. JAHDE — 2,519,659
FRONT MOUNT TRACTOR MOWER
Filed Jan. 27, 1949 — 4 Sheets-Sheet 1
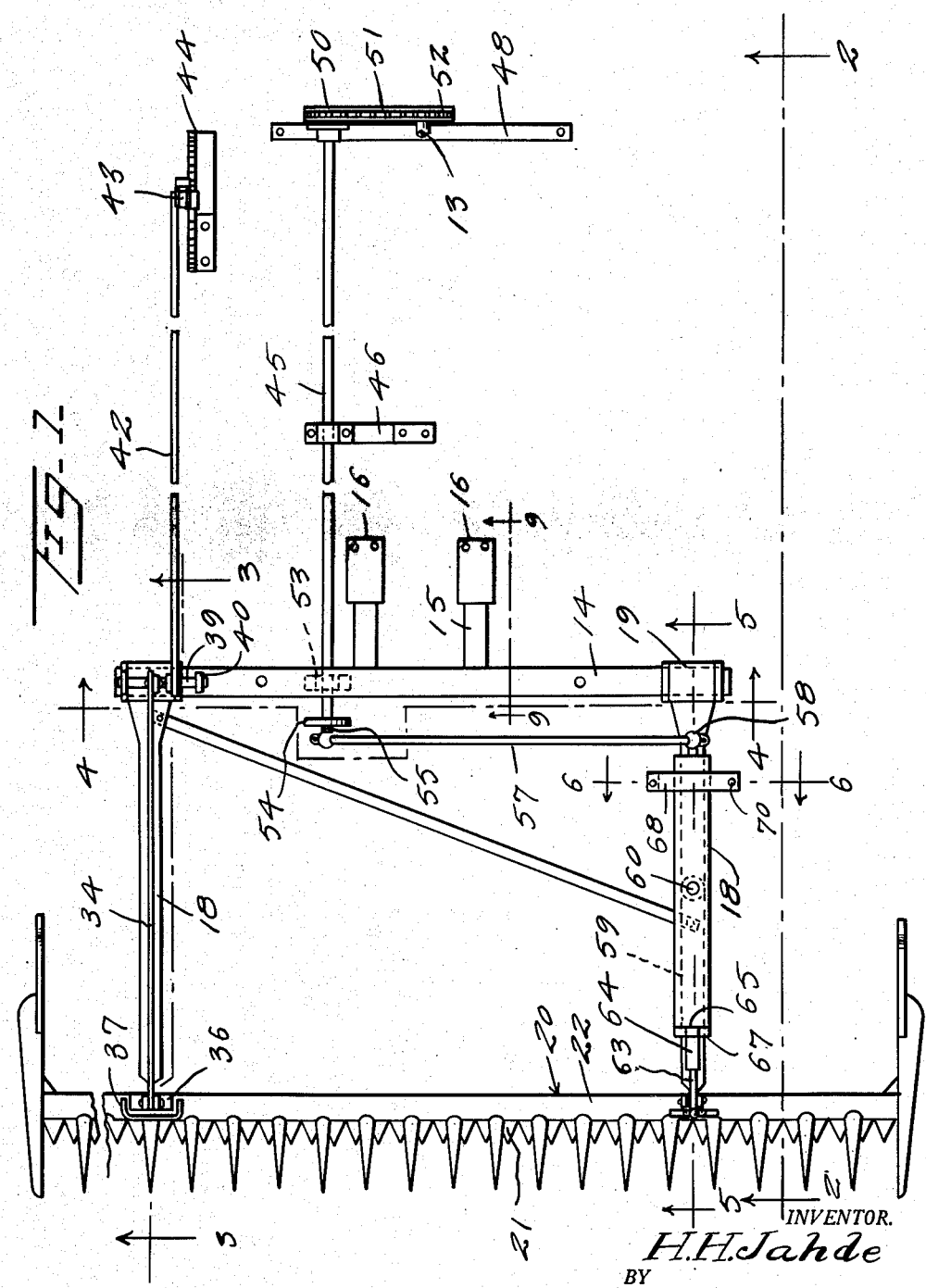
INVENTOR.
H. H. Jahde
BY
Kimmel & Crowell Attys.

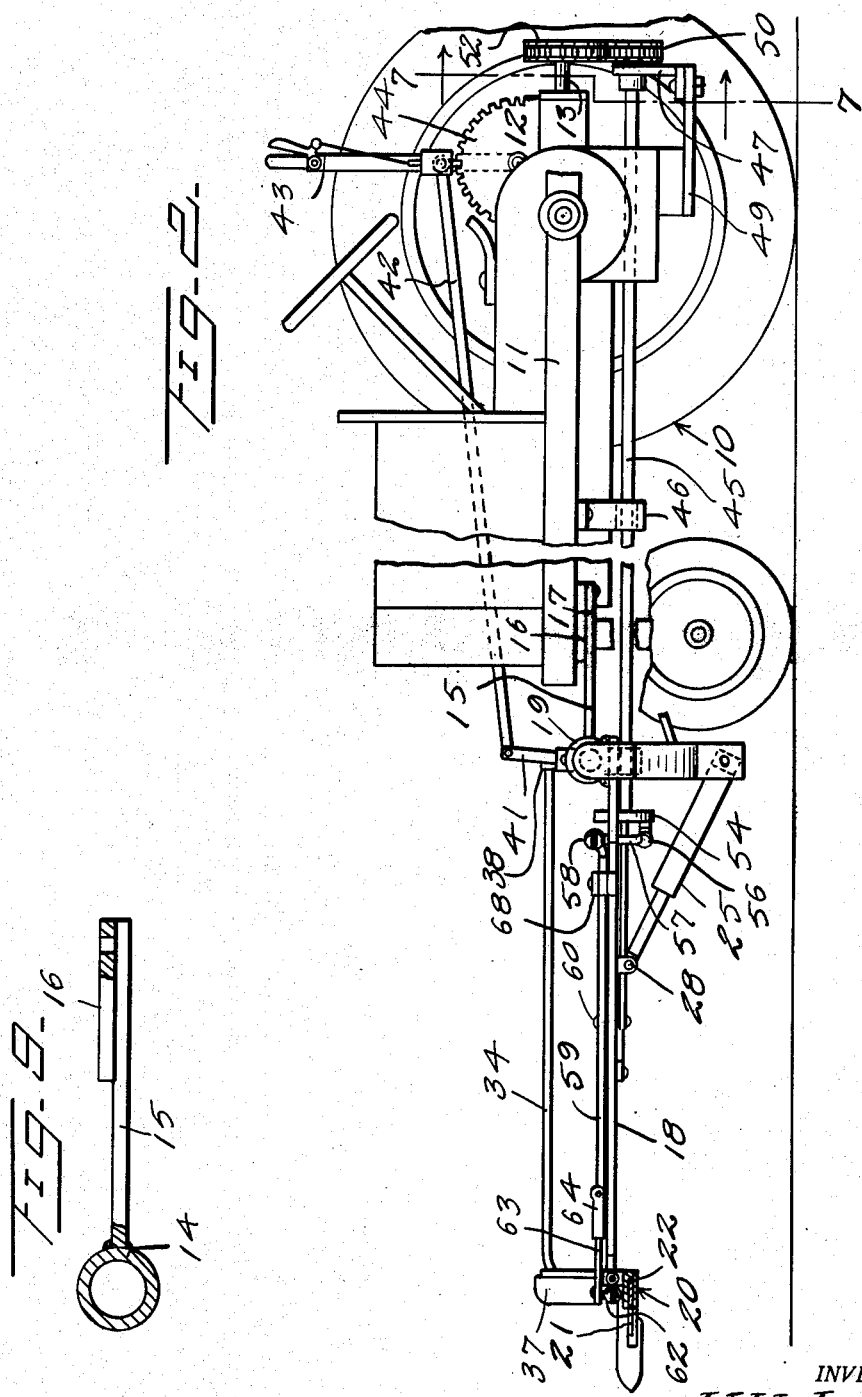

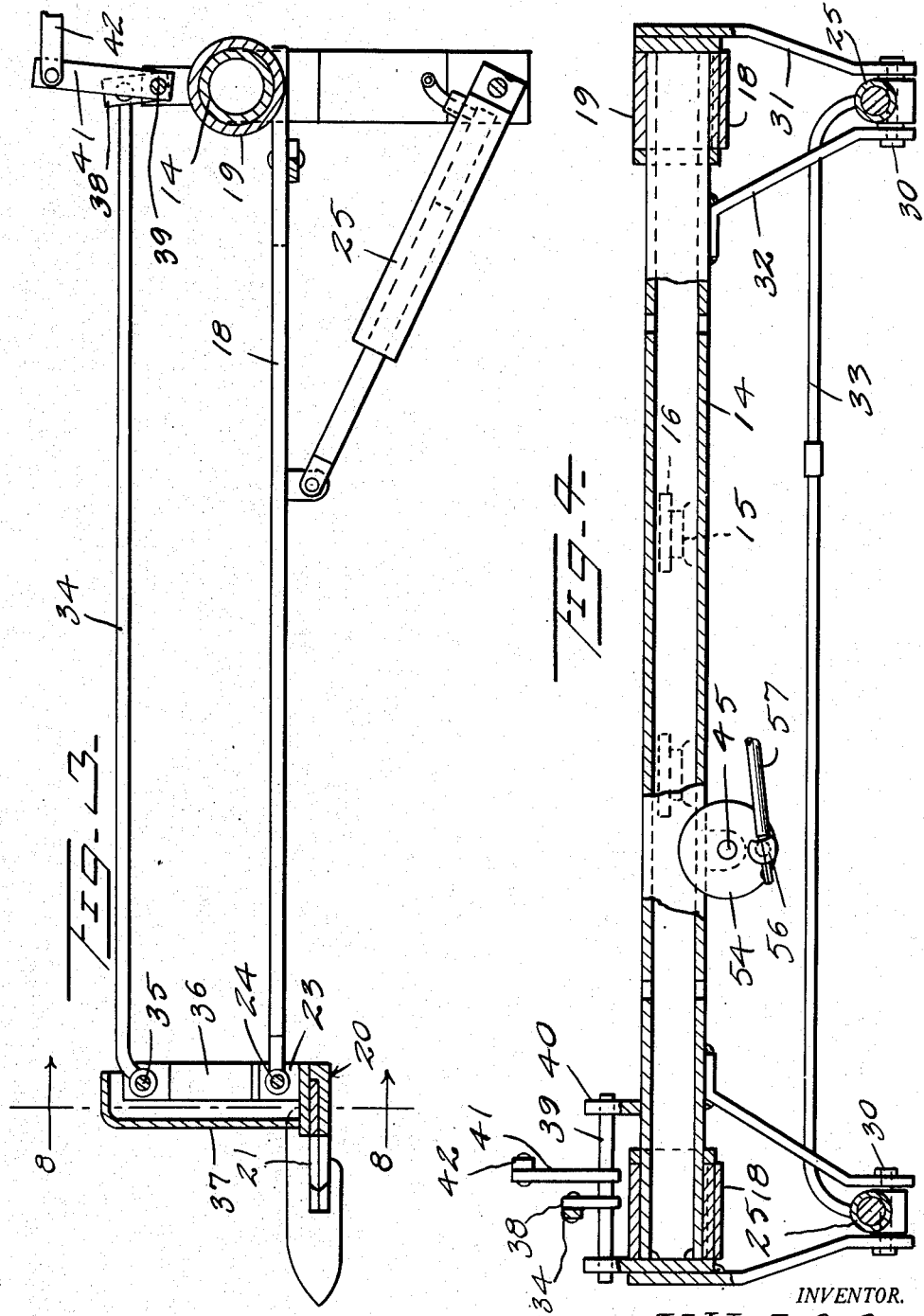

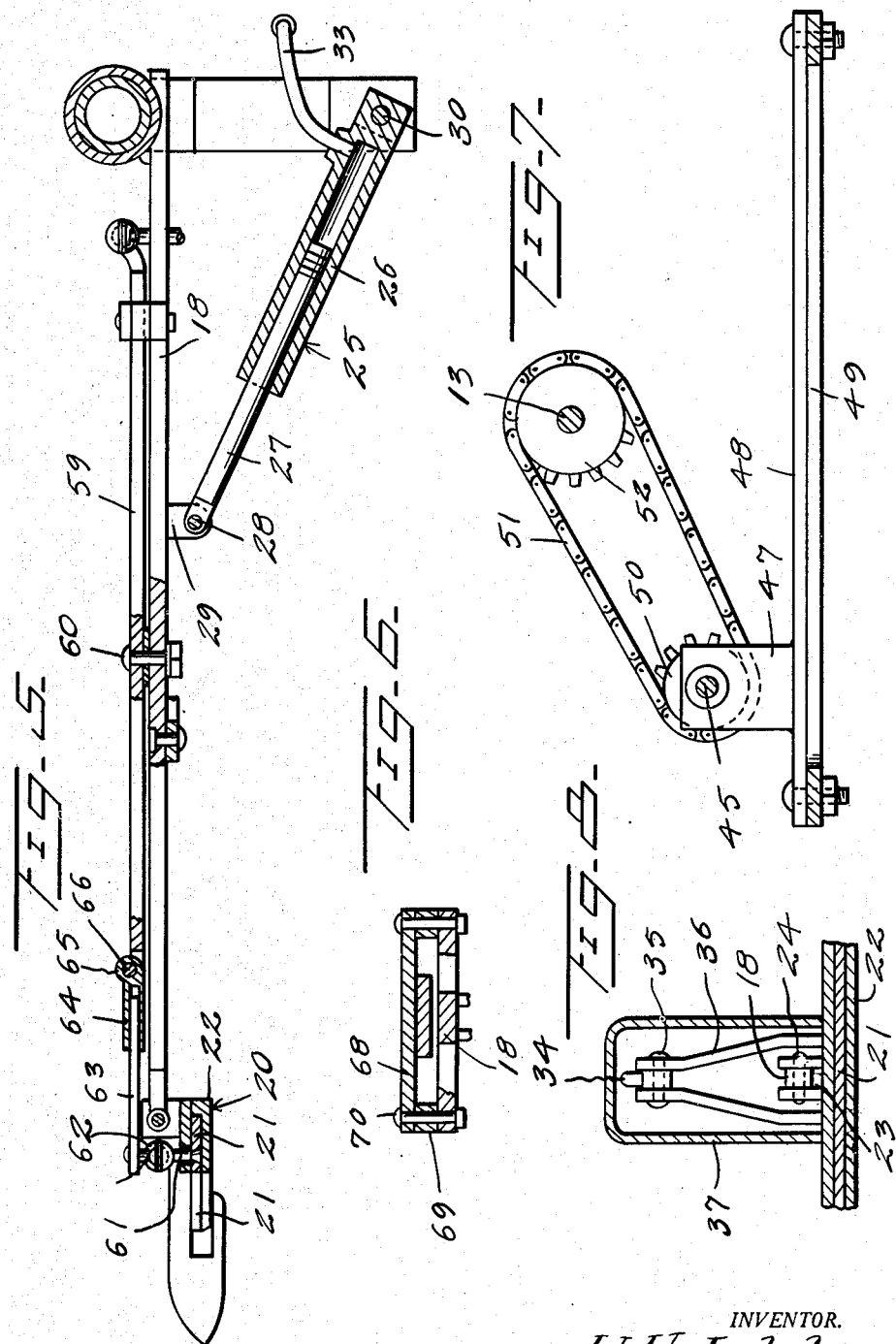

Patented Aug. 22, 1950

2,519,659

UNITED STATES PATENT OFFICE 2,519,659

FRONT MOUNT TRACTOR MOWER

Harlan H. Jahde, Pender, Nebr.

Application January 27, 1949, Serial No. 73,128

2 Claims. (Cl. 56—26.5)

This invention relates to a cutter or harvesting attachment for the front of a tractor.

An object of this invention is to provide a mower and means for mounting the same on the front of a tractor, together with means for connecting the mower with the power take-off.

Another object of this invention is to provide an attachment of this kind including means for adjusting the cutting height of the cutter and for rocking the cutter to any desired angular relation with respect to the horizontal.

A further object of this invention is to provide a mower attachment of this kind which can be easily adapted to fit various types and sizes of tractors, and the mower blades can be made of any desired length to cut the desired swath at each run of the tractor.

With the above and other objects in view, my invention consists in the arrangement, combination and details of construction disclosed in the drawings and specification, and then more particularly pointed out in the appended claims.

In the drawings:

Figure 1 is a plan view, partly broken away, of a mower attachment for the front of a tractor constructed according to an embodiment of this invention, Figure 2 is a detail side elevation, partly broken away, showing the device in applied position on the front of the tractor, Figure 3 is a fragmentary sectional view taken on the line 3—3 of Figure 1, Figure 4 is a sectional view taken on the line 4—4 of Figure 1, Figure 5 is a fragmentary sectional view taken on the line 5—5 of Figure 1, Figure 6 is a sectional view taken on the line 6—6 of Figure 1, Figure 7 is a sectional view taken on the line 7—7 of Figure 2, Figure 8 is a fragmentary sectional view taken on the line 8—8 of Figure 3, Figure 9 is a fragmentary sectional view taken on the line 9—9 of Figure 1.

Referring to the drawings, the numeral 10 designates generally a tractor of conventional construction embodying a frame 11 having a power take-off 12, and a power take-off shaft 13 extending from the rear thereof.

A tubular frame member 14 is disposed at the front of the tractor 10 and has secured to the rear side thereof a pair of rearwardly extending bars or longitudinal support members 15 to which plates 16 are secured, and the plates 16 are adapted to be secured by suitable fastening means 17 to the underside of the frame 11 of the tractor, at the forward end of the latter. The tubular frame member 14 extends transversely across the front of the tractor, being of any desired length to provide spaced ends formed as spur shafts and a pair of elongated arms or bars 18 formed with sleeves 19 at the rear thereof, are rockably mounted on the ends of said frame member 14.

The supporting bars 18 have rockably mounted on the forward ends thereof a reciprocating cutter member 20 of conventional construction, including a laterally reciprocating cutter blade 21 and a stationary blade or guide 22 terminating in outwardly spaced extended ends formed as guide arms. The stationary guide or blade 22 is rockably mounted at the forward ends of the two supporting bars 18 by forming pairs of upwardly extending ears 23 on the upper side of the guide 22 and securing the forward ends of the bars 18 between the ears 23 on a pivot 24 which extends through a pair of ears 23.

The bars 18 are adapted to be raised or lowered for raising or lowering the cutter 20 by means of a pair of hydraulic members 25 including a cylinder 26 and a plunger 27 secured to the lower side of a bar 18 by means of a pivot 28 engaging between a pair of ears 29 extending downwardly from the lower side of the bar 18. The cylinder 26 is rockably mounted on a pivot 30 which engages through the lower ends of a pair of downwardly convergent supporting bars 31 and 32 which are fixed to the frame member 14. The two cylinders 26 are adapted to be connected by means of a pipe 33 to a source of fluid pressure which is normally associated with the tractor 10.

In order to provide a means whereby the cutter 20 may be angularly adjusted with respect to the supporting bars or arms 18 so that the cutter 20 may be tilted in a desired direction or maintained in a horizontal position with the bars or arms 18 inclined downwardly and forwardly, I have provided a cutter adjusting means including an elongated rod 34 which extends over one of the supporting bars 18 and is secured at the forward end thereof, as shown in Figure 8, on a pivot 35 engaging through a pair of upwardly extending bars 36 which are fixed to the guide or stationary cutter bar 22.

A hood or guard 37 is adapted to be positioned about the bars 36 and the forward end of the rod 34 to prevent any plants or the like from catching onto the bars 36 and the rod 34. The rear end of the rod 34 is pivotally mounted on an upwardly extending arm 38 which is fixed to a shaft 39 rockably mounted between a pair of upwardly extending lugs 40 which are fixed to the frame member 14. The shaft 39 also has fixed thereto an upwardly extending lever arm 41 which with arm 38 and shaft 39 form a U-shaped clevis structure to which is connected the forward end of an adjusting rod 42. The adjusting rod 42 extends rearwardly and is pivotally connected to a latching lever 43 pivotally mounted with respect to a quadrant 44 fixed to the rear of the tractor 10, as shown in Figure 2.

The movable cutter member 21 is reciprocated by means of a connection with the power take-off shaft 13 and this is accomplished by providing a relatively long shaft 45 which is rotatably supported along one side of the frame 11 by means of bearings 46 and 47 with the latter secured to a supporting bar 48 which is detachably mounted on the drawbar 49 conventionally carried by the rear of the tractor 10.

The shaft 45 has fixed thereto a sprocket 50 about which a chain 51 engages, and a second sprocket 52 is fixed to the take-off shaft 13. A forward bearing 53 is fixed to the lower side of the frame member 14 and a crank plate 54 is fixed to the forward end of the shaft 45. The plate 54 has fixed thereto a crank pin 55 which includes a ball socket 56.

A pitman 57 is coupled to the ball socket 56 and is formed at its outer end with a ball socket 58 which engages a ball carried by a horizontal rockable lever 59 mounted on a pin 60 which is carried by the adjacent cutter supporting bar 18.

The reciprocating cutter bar 21 has secured thereto a ball 61 which engages in a ball socket 62 carried by a rod 63. The rod 63 extends rearwardly and is slidable in a sleeve 64 which is carried by a barrel 65 through which a pintle 66 engages. The forward end of the lever 59 is formed with a pair of hinged barrels 67 through which the pintle 66 engages so that when the sliding rod 63 is uncoupled from the movable cutter 21, the rod 63 may be rocked upwardly and rearwardly out of the way. The rear portion of the lever 59 engages through a pair of parallel guide bars 68 which are carried by the adjacent supporting bar 18 and are spaced from each other by spacers 69 through which fastening means 70 engage.

In the use and operation of this device, the frame member 14 is secured by the supporting members 15 and 16 to the forward portion of the tractor frame 11. The quadrant 44 with the latching lever 43 is mounted at the rear portion of the tractor and the fluid supply line 33 is connected to the hydraulic supply which is carried by the tractor 10. When the mower is in operation, the levers 18 may be rocked downwardly by the hydraulic members 25 and the cutter 20 may also be angularly adjusted by rocking of the latching lever 43. With a mower as hereinbefore described, the mower may be made of any desired length and a relatively wide swath may be cut ahead of the tractor. The length of the cutter 20 of course, determines the width of the swath which is cut by the mower. When the mower is in inoperative position, the bars or levers 18 may be raised upwardly by the hydraulic adjusting members 25.

I do not mean to confine myself to the exact details of construction herein disclosed but claim all variations falling within the purview of the appended claims.

What I claim is:

1. A mower attachment for mounting on the front of a tractor having an engine carried by a body disposed above the ground traversed comprising a pair of longitudinal extending support members carried by the body having forwardly extended ends spaced therefrom, a transverse tubular member carried by said extended ends having free ends spaced at each side of the body, said spaced ends being formed as spur shafts, a pair of longitudinally extending arms rockably carried by said spur shafts having spaced free ends disposed forwardly of said transverse member, a U-shaped clevis carried at one end of said transverse member, a cutter bar pivotally secured to said spaced free ends of the longitudinally extending arms having outwardly spaced extended arms formed as spaced guide members and a reciprocating cutter blade means carried by said cutter bar for reciprocative movement relative to said cutter bar, a vertical lever carried by said cutter bar, a longitudinally extending lever having one end connected to said vertical lever and an opposite end pivotally carried by said U-shaped clevis, an operating lever connected to said clevis for rocking the cutter bar at the end of said longitudinally extending arm ends angularly relative to the ground traversed, a hydraulic lift means carried by the tractor and having a pivoted end connected to the longitudinally extending arms for rocking said arms to raise and lower the cutter bar relative to the ground traversed, and reciprocating means operatively connecting the cutter blade to the tractor engine.

2. A mower attachment for mounting on the front of a tractor having an engine carried by a body disposed above the ground traversed comprising a pair of longitudinal extending support members carried by the body having forwardly extended ends spaced therefrom, a transverse support member carried by said extended ends having free ends spaced at each side of the body, said spaced ends being formed as fixed pivot mounts, a pair of longitudinally extending arms rockably carried by said pivot mounts having spaced free ends disposed forwardly of said transverse member, a rockable lever carried by said transverse member, a cutter bar pivotally secured to said spaced free ends of the longitudinally extending arms and a reciprocating cutter blade means carried by said cutter bar for reciprocative movement relative to said cutter bar, a vertical lever carried by said cutter bar, a longitudinally extending lever having one end connected to said vertical lever and an opposite end pivotally carried by said rockable lever, an operating lever connected to said rockable lever for rocking the cutter bar at the end of said longitudinally extending arm ends angularly relative to the ground traversed, a hydraulic lift means carried by the tractor and having a pivoted end connected to the longitudinally extending arms for rocking said arms to raise and lower the cutter bar relative to the ground traversed, and reciprocating means operatively connecting the cutter blade to the tractor engine.

HARLAN H. JAHDE.

REFERENCES CITED

The following references are of record in the file of this patent:

UNITED STATES PATENTS

| Number | Name | Date |
|---|---|---|
| 1,116,390 | Davis | Nov. 10, 1914 |
| 2,288,498 | Underwood | June 30, 1942 |

FOREIGN PATENTS

| Number | Country | Date |
|---|---|---|
| 276,863 | Great Britain | Sept. 8, 1927 |